United States Patent
Kaneko

(10) Patent No.: US 6,619,242 B2
(45) Date of Patent: Sep. 16, 2003

(54) COMBUSTION CONTROL APPARATUS FOR ENGINE

(75) Inventor: Makoto Kaneko, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/075,773

(22) Filed: Feb. 13, 2002

(65) Prior Publication Data

US 2002/0117126 A1 Aug. 29, 2002

(30) Foreign Application Priority Data

Feb. 23, 2001 (JP) ........................................ 2001-048873

(51) Int. Cl.⁷ .............................................. F02B 69/06
(52) U.S. Cl. ...................... 123/21; 123/90.15; 123/27 R
(58) Field of Search ................. 123/21, 90.15, 123/27 R

(56) References Cited

U.S. PATENT DOCUMENTS 3,125,079 A * 3/1964 Hoffmann ................... 123/262
4,037,412 A * 7/1977 Jones ......................... 60/605.1
6,213,086 B1 * 4/2001 Chmela et al. ............. 123/276

FOREIGN PATENT DOCUMENTS

JP          9-287528         11/1997     ......... F02M/25/07

* cited by examiner

Primary Examiner—Tony M. Argenbright
Assistant Examiner—Katrina Harris
(74) Attorney, Agent, or Firm—Darby & Darby

(57) ABSTRACT

A combustion control apparatus for an engine having a variable valve timing mechanism capable of varying valve timings of an exhaust valve and an intake valve establishes a combustion mode to either of following three modes, a four-cycle compression ignition combustion mode at a low and medium load area, a two-cycle spark ignition combustion mode at a high load area, and a four-cycle spark ignition combustion mode at a high speed area. When the combustion mode is established to the compression ignition combustion mode, the apparatus establishes the valve timings of the exhaust and intake valves so as to form a negative overlap period in which both exhaust and intake valves concurrently close in the neighborhood of the exhaust top dead center (TDC).

5 Claims, 6 Drawing Sheets

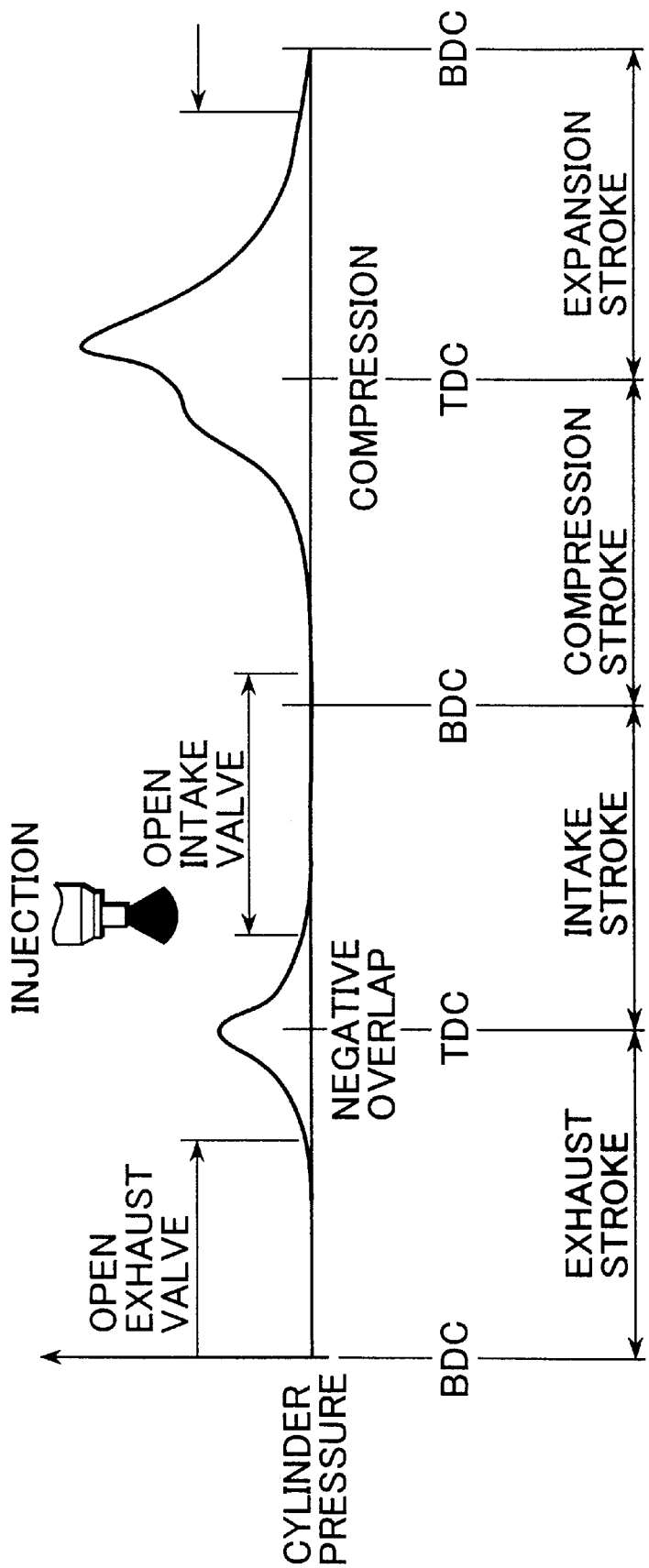

COMBUSTION CONTROL APPARATUS FOR ENGINE

BACKGROUND OF THE INVENTION

1. Field of the Invention

The present invention relates to a combustion control apparatus and more particularly to a control apparatus for varying a combustion mode according to engine operating conditions.

2. Description of Background Arts

It is well known that lean air-fuel mixture combustion is an effective means for raising thermal efficiency of four cycle engines. The reason why lean mixture raises thermal efficiency is that it increases a ratio of specific heat capacities of working gas and provides an improved theoretical thermal efficiency. Also it is known that lean air-fuel mixture can reduce a pumping loss of an engine due to an increased intake air.

However, lean air-fuel mixture combustion provides an elongated combustion period of time and instable combustion and therefore lean air-fuel mixture has a lean limit. A stratified charge combustion strategy, in which a rich air-fuel mixture is concentrated about a spark plug by stratifying the air-fuel mixture gas in a cylinder by means of an in-cylinder fuel injection method, is effective for raising this lean limit. However, the stratified charge combustion strategy has an disadvantage that since the rich air-fuel mixture is concentrated about the spark plug, nitrogen oxides (NOx) emissions increase.

On the other hand, diesel engines have a high thermal efficiency due to the combustion by compression ignition and have a high lean limit. However, the diesel engines have low outputs and sometimes emit a large amount of smokes due to an inferior rate of air utilization at high loads.

To solve these problems, compression ignition gasoline engines in which air-gasoline mixture is ignited at multi-spots (multi-spots ignition) by an adiabatic compression, are proposed. The compression ignition gasoline engines have an advantage that since theses engines have short flame propagations due to multi-spots ignition, a fast burn is realized. As a result, local high temperature spots are difficult to be produced in a combustion chamber and therefore emissions of nitrogen oxides can be largely reduced.

In order to accomplish the compression ignition, the compression ratio must be established at a value as high as 15:1 to 18:1 of compression ratio. When an engine operates at high loads, the combustion pressure rapidly increases due to an increased amount of fuel injected and as a result knocking is apt to occur.

To solve this problem, Japanese Patent Application Laid-open No. Toku-Kai-Hei 9-287528 discloses a technique wherein the temperature of the combustion chamber is reduced by an external EGR effect or a technique wherein the temperature of intake air is regulated by a cooling device provided in an EGR passage.

The combustion control by the external EGR effect or the temperature of intake air has a dull response and therefore it is difficult to obtain a good follow-up ability to changing torques of the engine during traveling of the vehicle.

Further, in order to avoid a knocking phenomena of the engine, there is an idea of introducing a so-called "miller cycle" in which an actual compression ratio is established to be smaller than an actual expansion ratio, however when the engine operates according to the miller cycle under a low speed and high load condition, an insufficient amount of air is supplied to the combustion chamber, this leading to a decrease in torque.

SUMMARY OF THE INVENTION

In an engine having a high compression ratio to realize a compression ignition, it is an object of the present invention to provide a combustion control apparatus for an engine capable of avoiding an occurrence of knocking and a decrease of torque in a high load area and reducing exhaust emissions in an overall operating area.

To achieve the object, a combustion control apparatus for an engine having a variable valve timing mechanism capable of varying valve timings of an exhaust valve and an intake valve, comprises a combustion mode establishing means for establishing a combustion mode to either of at least following two modes, a compression ignition combustion mode and a two-cycle spark ignition combustion mode according to an operational area of the engine and a valve timing establishing means for establishing said valve timings of the exhaust and intake valves so as to form a negative overlap period in which both exhaust and intake valves concurrently close in the neighborhood of the exhaust top dead center, when the combustion mode is established to the compression ignition combustion mode and for establishing the valve timings of the exhaust and intake valves so as to carry out a gas exchange once per one revolution of the engine, when the combustion mode is established to the two-cycle spark ignition combustion mode.

BRIEF DESCRIPTION OF THE DRAWINGS

FIG. 4a is an explanatory diagram of an engine in a four cycle compression ignition combustion mode;

DESCRIPTION OF THE PREFERRED EMBODIMENT

Figure 1:
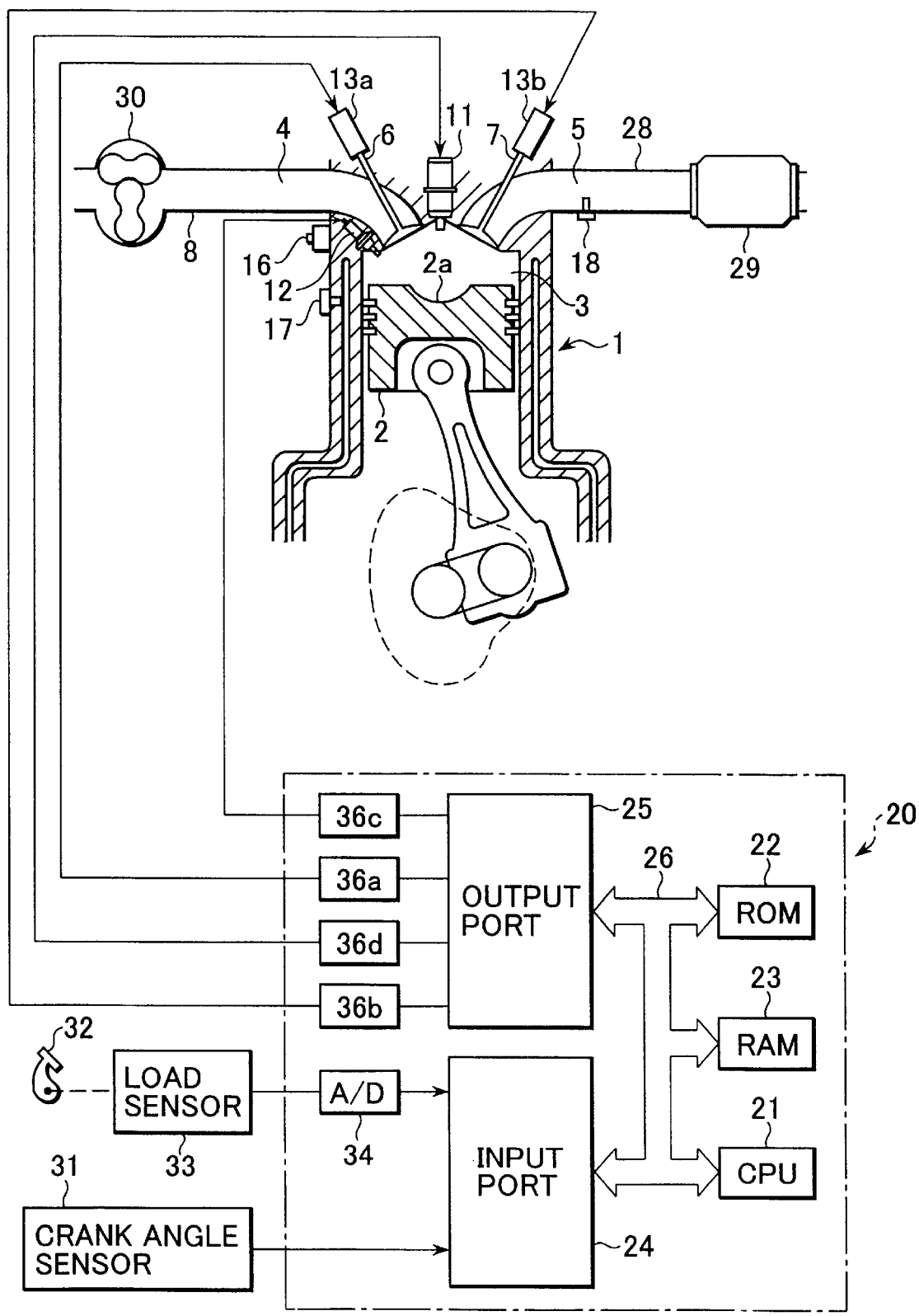
FIG. 1 is a schematic diagram showing an engine according to an embodiment of the present invention.

Referring now to FIG. 1, reference numeral 1 denotes an engine, reference numeral 2 denotes a piston, reference numeral 3 denotes a combustion chamber, reference numeral 4 denotes an intake port, reference numeral 5 denotes an exhaust port, reference numeral 6 denotes an intake valve, reference numeral 7 denotes an exhaust valve, and reference numeral 8 denotes an intake passage. A mechanical type supercharger 30 is disposed in the intake passage 8 of the intake port 4. Further, there is provided a throttle valve (not shown) upstream of the supercharger 30. The throttle valve is interlocked with an electronic throttle control apparatus (not shown). Further, an injection nozzle of a fuel injector 11 is provided in the center of a ceiling surface of the combustion chamber 3. Further, a piston cavity 2a which is inwardly concave is formed on the top surface of the piston 2. Further, an electrode of a spark plug 12 is provided on one side (squish area according to this embodiment). In FIG. 1, reference numeral 16 denotes a knock sensor and reference numeral 17 denotes a coolant temperature sensor.

Further, an oxygen sensor 18 is disposed in an exhaust passage 28 connecting to the exhaust port 5 and a three-way catalyst 29 is installed downstream of the oxygen sensor 18. The oxygen sensor 18 is a means for detecting air-fuel ratio and the three-way catalyst 29 is for purifying carbon monoxide (CO) hydrocarbons (HC) and nitrogen oxides (NOx).

As will be described hereinafter, in case of the engine 1, when the engine operates at low or medium speeds and operates at low and medium loads, the combustion mode can be established to a four-cycle compression ignition combustion with ultra-lean air-fuel ratio. In this case, according to the four-cycle compression ignition combustion, since the combustion temperature can be retained below the temperature of NOx formation, NOx emissions are very small. Furthermore, since excess air ratio is high, the three-way catalyst 29 purifies CO and HC in exhaust gas by oxidization. That is, in this case, the three-way catalyst 29 acts as an oxidization catalyst.

Further, the engine 1 is established to a compression ratio as high as around 15:1 to 18:1.

Further, the intake vale 6 and exhaust valve 7 are driven by variable valve timing mechanisms 13a, 13b respectively. These variable valve timing mechanisms 13a, 13b are constituted by known electromagnetically operated valves capable of arbitrarily controlling valve opening and closing timings.

Figure 3:
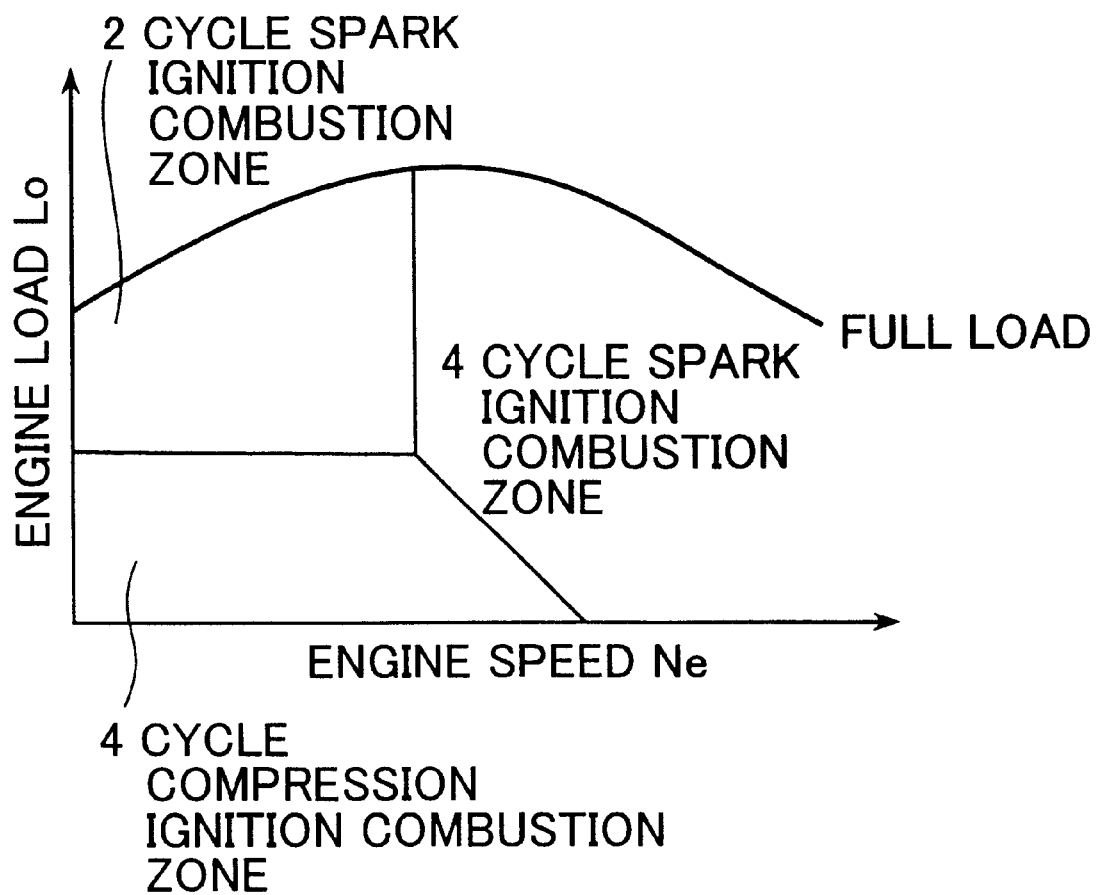
FIG. 3 is an explanatory diagram showing an operational map of an engine.

Referring to FIG. 3, according to the embodiment, the engine operational map is divided into three zones, a four-cycle compression ignition combustion zone covering low and medium speeds areas and low and medium loads areas, a two cycle spark ignition combustion zone covering low and medium speeds areas and high loads areas, and a four cycle spark ignition combustion zone covering high speeds areas. The intake and exhaust valves operate at different timings for each driving zone. Since this engine is established to have a characteristic giving priority to compression ignition combustion, knocking easily occurs. To avoid this, when the engine operates at low and medium speeds and high loads areas, it is established to a two-cycle operation mode in which an actual compression ratio (ratio of stroke volume since intake valve closes until piston reaches the top dead center to a volume of combustion chamber when piston is at the top dead center) is reduced. The two-cycle operation brings about not only a prevention of knocking but also a stabilization of combustion.

That is, in the four-cycle compression ignition zone as shown in FIG. 4a, when the exhaust valve 7 closes at an crank angle advanced over the exhaust top dead center (TDC) and the intake valve 6 opens at an crank angle retarded over the exhaust top dead center (TDC), a negative valve overlap period wherein both valve 6, 7 close at the neighborhood of the exhaust top dead center (TDC) is formed. The timing of closing of the exhaust valve 7 is established to be almost symmetric to the timing of opening of the intake valve 6 with the exhaust top dead center (TDC) between.

Figure 4B:
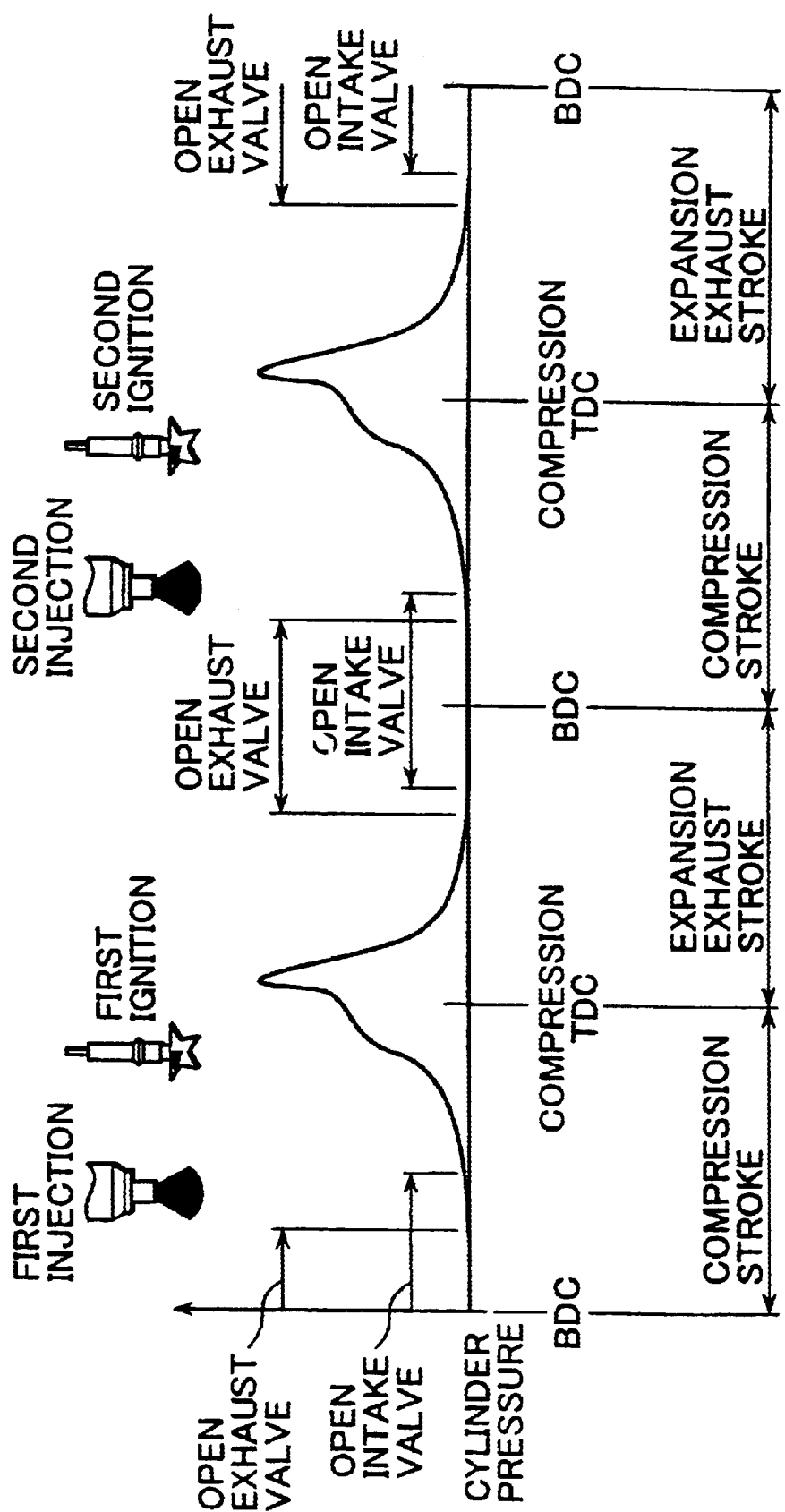
FIG. 4b is an explanatory diagram of an engine in a two cycle spark ignition combustion mode.

Further, in the two-cycle spark ignition combustion zone as shown in FIG. 4b, when the exhaust valve 7 and intake valve 6 open every one revolution of the engine and one gas change is performed every one revolution of the engine, the supercharged charge enters into the combustion chamber 3 through the intake valve opening in the latter part of the expansion exhaust stroke and the burned gas is scavenged by the chrge.

Figure 4C:
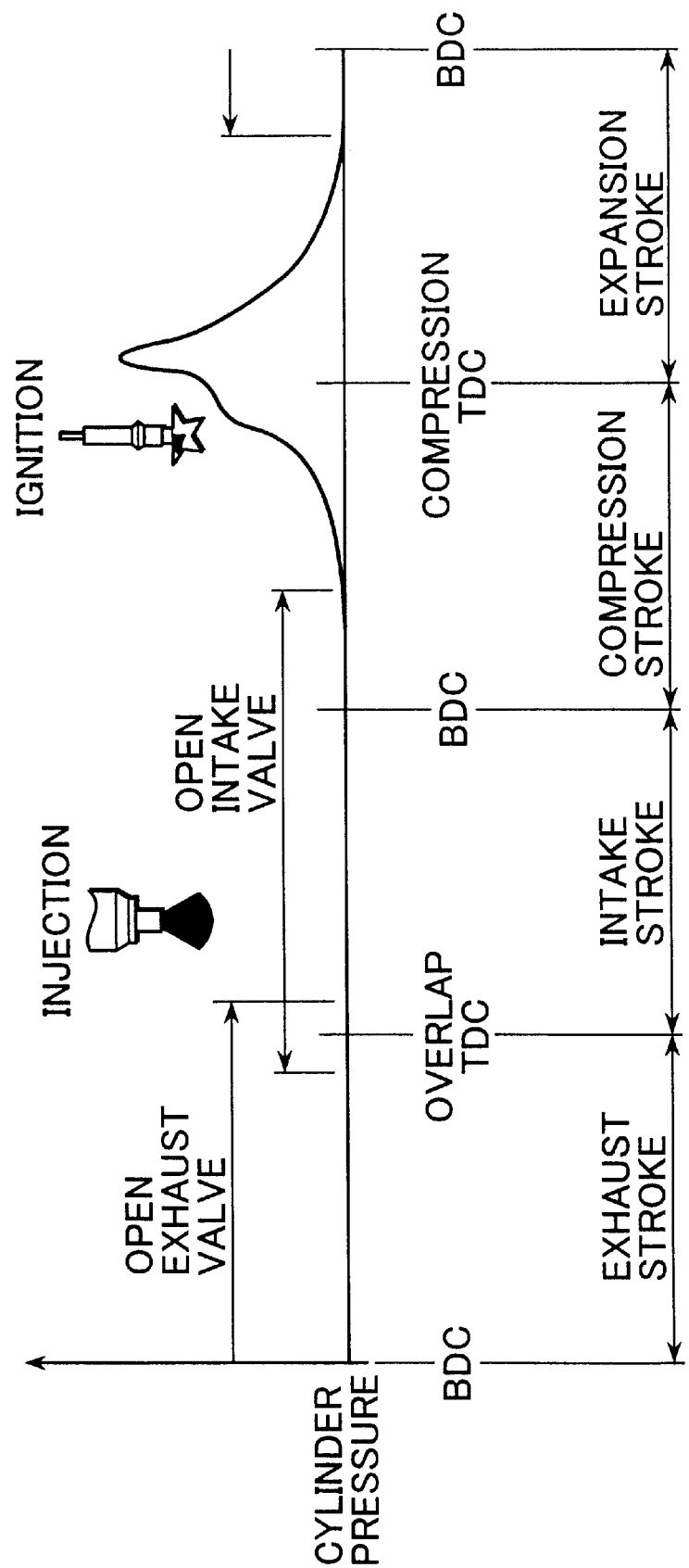
FIG. 4c is an explanatory diagram of an engine in a four cycle spark ignition combustion mode.

Further, in the four-cycle spark ignition combustion zone as shown in FIG. 4c, when the exhaust valve 7 and intake valve 6 open once respectively every two revolutions of the engine, a positive valve overlap period in which both valves 6, 7 open in the neighborhood of the exhaust top dead center (TDC) is formed. Then, a miller cycle operation is available by retarding the closing timing of the intake valve 6.

Signals sensed by the respective sensors are inputted to an electronic control unit (ECU) 20. The ECU 20 is a microcomputer constituted by CPU 21, ROM 22, RAM 23, an input port 24, an output port 25, a bus line 26 and the like.

Besides those sensors, the input port 24 is connected with a crank angle sensor 31 that generates crank pulses every specified crank angle and is also connected with a load sensor 33 that generates an output voltage corresponding to the amount of depression of an accelerator pedal 32 through an A/D converter 34. Further, the output port 25 is connected with the variable valve train mechanisms 13a, 13b through an intake valve actuating circuit 36a, an exhaust valve actuating circuit 36d, respectively. Further, the output 25 is connected with the spark plug 12 through an ignition drive circuit 36c and is connected with the fuel injector 11 through an injector drive circuit 36d.

A bypass passage (not shown) bypassing the mechanical supercharger 30 is provided in the intake passage 8 and a boost pressure control valve (not shown) for controlling a boost pressure is provided in the bypass passage. Further, an actuator for actuating the boost pressure control valve is connected with the output port 25 through a drive circuit. The boost pressure control valve is designed so as to open when the engine operates at high speeds and at high loads. When the boost pressure control valve opens, the boost pressure goes down and as a result abnormal combustion such as knocking can be prevented.

The ECU 20 investigates an operation zone map based on an engine speed Ne calculated from a signal of the load sensor 33 and an engine load Lo detected from a signal of the load sensor 33 to judge whether the current operation of the engine is either in a four-cycle compression ignition combustion zone, in a two-cycle spark ignition combustion zone or in a four-cycle spark ignition combustion zone. When the operation of the engine is in the four-cycle compression ignition combustion zone, the throttle valve fully openes and the valve timing is changed. As a result, the intake air is heated by residual gas shut in the combustion chamber 3 during the negative overlap period and the temperature of the intake air rises. Thus, an optimum compression ignition combustion is obtained by adiabatic compression.

Further, when the operation of the engine is in a two-cycle spark ignition combustion zone, the intake valve 6 and exhaust valve 7 are designed so as to open in the neighborhood of the bottom dead center (BDC). As a result, air intake and scavenging are performed by boost pressure of the mechanical supercharger 30 and the two-cycle spark ignition combustion is available. Even when the compression ratio is relatively high (for example, 15:1 to 18:0), a good combustion can be obtained, while knocking is prevented from occurring and the reduction of torque is avoided.

Further, when the operation of the engine 1 is in a four-cycle spark ignition zone, the boost pressure is adjusted by controlling the aforesaid boost pressure control valve. As a result, abnormal combustion such as knocking can be prevented and high output is obtained by the normal spark ignition combustion control.

Figure 2:
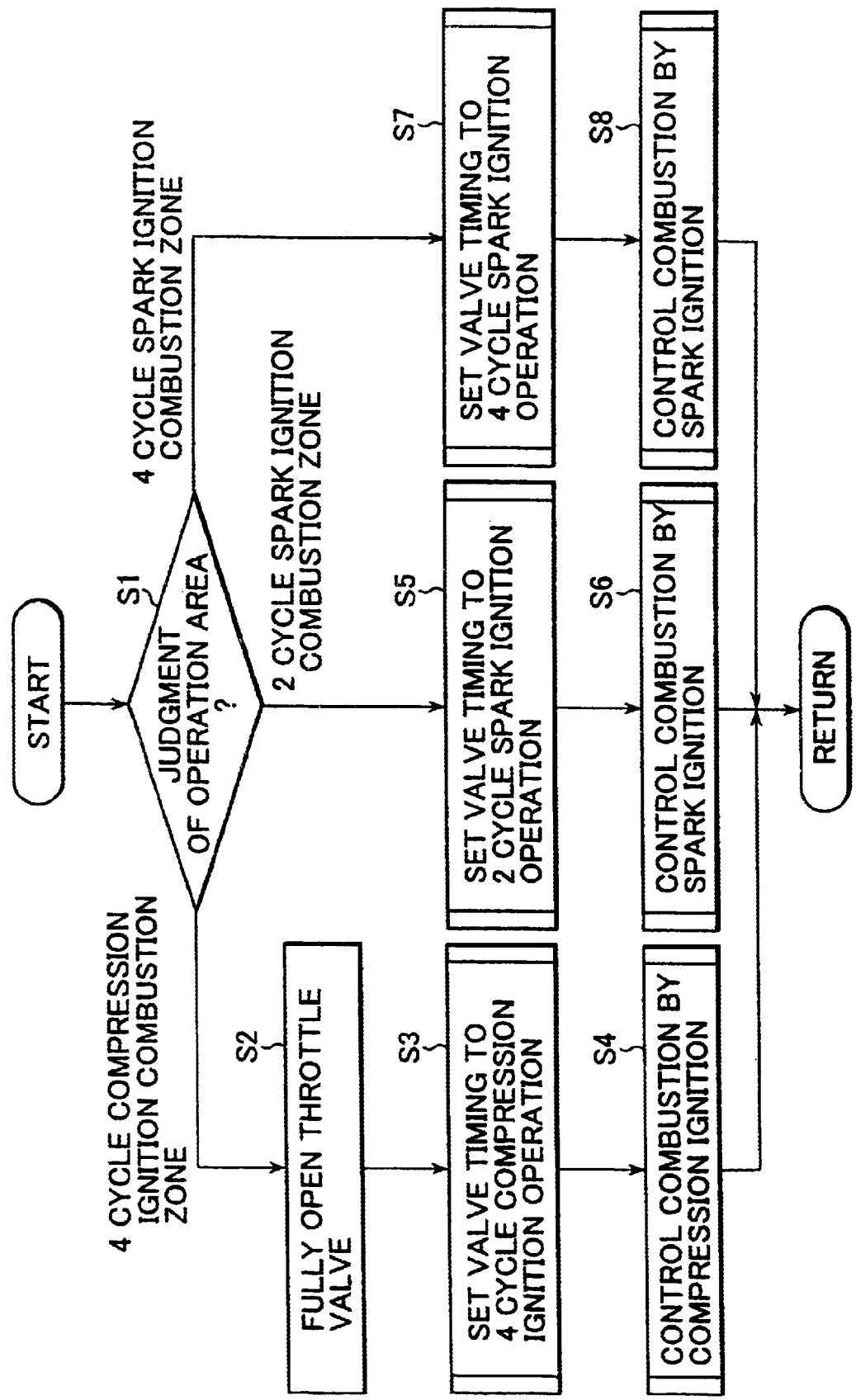
FIG. 2 is a flowchart showing a combustion control routine.

The fuel injection control, the ignition timing control and the valve timing control, which are processed in the ECU 20, are executed according to the combustion control routine shown in FIG. 2.

According to the routine, first at a step S1, it is investigated whether the engine 1 operates in either of the four-cycle compression ignition combustion zone, two-cycle spark ignition zone or four-cycle spark ignition combustion zone by referring to an operation zone map shown in FIG. 3 based on engine speed Ne and engine load Lo. When the engine 1 operates in a four-cycle compression ignition combustion zone, the program goes to a step S2. When the engine 1 operates in a two-cycle spark ignition combustion zone, the program goes to a step S5. When the engine 1 operates in a four-cycle spark ignition combustion zone, the program goes to a step S7. According to the embodiment, as shown in FIG. 3, the four-cycle compression ignition combustion zone is established at an area of low and medium speed and low and medium load, the two-cycle spark ignition combustion zone is established at an area of low and medium speed and high load, and the four-cycle spark ignition combustion zone is established at an overall area of high speed.

When the program goes to the step S2, the throttle valve 9 fully opens. Then, at a step S3, an drive signal of valve timing is outputted to the variable valve timing mechanisms 13a, 13b such that the intake and exhaust valves 6, 7 form a negative overlap period covering the neighborhood of the exhaust top dead center (TDC).

As a result, as shown in FIG. 4a, a residual gas is shut in the combustion chamber 3 during the negative overlap period. The thermal energy of the residual gas heats up a fresh air sucked into the combustion chamber 3 during intake stroke and raises the temperature of the fresh air. As a result, since the mixture gas temperature at the start of compression stroke already becomes high, the mixture gas in the combustion chamber 3 can easily reaches the ignitable temperature through an adiabatic compression.

Next, the program goes to a step S4 where the combustion based on compression ignition is performed and leaves the routine. In the compression ignition combustion control, since the throttle valve fully opens and the engine operates at low load, the air-fuel ratio is in a lean condition. Fuel is injected at a specified timing. Since the mixture gas easily reaches the ignitable temperature, the compression combustion is performed according to a multi-spots ignition combustion (homogeneous compression ignition combustion) wherein an overall mixture gas is simultaneously ignited without flame propagation, like by an infinite number of spark plugs.

Further, when it is Judged that the engine operation is in a two-cycle spark ignition combustion zone and the program goes to the step 5, a drive signal for opening the intake and exhaust vales 6, 7 in the neighborhood of the bottom dead center (BDC) is outputted to the variable valve timing mechanisms 13a, 13b, respectively. As a result, as shown in FIG. 4b, first the combustion gas is discharged through the exhaust valve 7 in the latter half of the expansion and exhaust stroke. Next, the intake valve 6 opens to supply fresh gas boosted by the supercharger 30 to the combustion chamber 3 and at the same time the residual combustion gas in the combustion chamber 3 is scavenged by the fresh air. When the piston passes the bottom dead center (BDC) fist the exhaust valve 7 closes and then the intake valve 6 closes. Thus, the engine enters into a compression stroke to start a two-cycle operation.

Next, the program goes to a step S6 wherein the two-cycle spark ignition combustion control is executed and leaves the routine. In this two-cycle spark ignition combustion control, the throttle valve (not shown) is returned to an interlocking operation with the accelerator pedal 32 and the engine operates with a specified air-fuel ratio established by engine speed Ne and engine load. When the engine operates at low and medium speed area and at high load area, although the compression ratio is as high as 15:1 to 18:1, knocking is prevented from occurring due to a reduced actual compression ratio. As a result, a stable combustion can be obtained without experiencing a reduced torque.

When it is judged that the engine operation is in a four-cycle spark ignition combustion zone and the program goes to the step S7, a drive signal of valve timing for forming a positive overlap period during which both exhaust and intake valves 7, 6 open in the neighborhood of the top dead center (TDC) and at the same time for retarding the valve closing timing of the intake valve 6 such that the actual compression ratio becomes smaller than the actual expansion ratio, is outputted to the variable valve timing mechanisms 13a, 13b. As a result, in this four-cycle spark ignition combustion zone, a miller cycle operation is performed.

Next, the program goes to a step S8 wherein a four-cycle spark ignition combustion control is executed, leaving the routine. In this four-cycle spark ignition combustion control, first the throttle valve (not shown) is returned to an interlocking operation with the accelerator pedal 32 and the fuel injection amount, the fuel injection timing, the ignition timing and the like are returned to values of normal spark ignition combustion control (see FIG. 4c). Further, the boost pressure is regulated by controlling the boost pressure control valve provided in the bypass passage. Detailed description of the control is omitted because of known arts.

Thus, according to the present invention, in an engine whose compression ratio is established to a value as high as 15:1 to 18:1, the four-cycle compression ignition combustion is carried out at a low and medium load area, the two-cycle spark ignition combustion is carried out at a high load area, and the four-cycle spark ignition combustion is carried out at a high speed area. Further, at a high speed area, a miller cycle is realized by changing the valve timings. As a result, the engine can obtain a high thermal efficiency, a high knocking resistance, and a good emissions performance.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A combustion control apparatus for an engine having a spark plug, a fuel injector for supplying fuel to a combustion chamber and a variable valve timing mechanism capable of varying valve timings of an exhaust valve and an intake valve, comprising:

a combustion mode establishing means for establishing a combustion mode to either of at least following two modes, a four-cycle compression ignition combustion mode and a two-cycle spark ignition combustion mode according to an operational area of said engine; and a valve timing establishing means for establishing said valve timings of said exhaust and intake valves so as to form a negative overlap period in which said both exhaust and intake valves concurrently close in the neighborhood of the exhaust top dead center, when said combustion mode is established to said four-cycle compression ignition combustion mode and for establishing said valve timings of said exhaust and intake valves so as to carry out a gas exchange once per one revolution of said engine, when said combustion mode is established to said two-cycle spark ignition combustion mode.

2. The combustion control apparatus according to claim 1, wherein said combustion mode is established to said four-cycle compression ignition combustion mode when said operational area of said engine is a low and medium load area and said combustion mode is established to said two-cycle spark ignition combustion mode when said operational area of said engine is a high load area.

3. The combustion control apparatus according to claim 1, wherein said combustion mode is established to a four-cycle spark ignition combustion mode when said operational area of said engine is a high speed area.

4. The combustion control apparatus according to claim 3, wherein said valve timing establishing means includes a means for retarding a valve closing timing of said intake valve such that an actual compression ratio is smaller than an actual expansion ratio when said combustion mode is established to said four-cycle spark ignition combustion mode.

5. The combustion control apparatus according to claim 1, wherein an injection nozzle of said fuel injector is provided in said combustion chamber.

* * * * *